(12) United States Patent
Inoue et al.

(10) Patent No.: US 7,721,402 B2
(45) Date of Patent: May 25, 2010

(54) METHOD OF PRODUCING APPLICATOR TIP

(75) Inventors: Hiroshi Inoue, Higashiosaka (JP);
Norimasa Kurihara, Shijonawate (JP);
Shoko Matsumoto, Tokyo (JP); Kyoko Sano, Nara (JP); Takeshi Omatsu, Kyotanabe (JP); Shigeki Yoneda, Neyagawa (JP); Yasunori Nakatani, Nishinomiya (JP); Hiroyoshi Yamamoto, Kobe (JP); Kozaburo Fujita, Yao (JP)

(73) Assignee: Sakura Color Products Corporation (JP)

( * ) Notice: Subject to any disclaimer, the term of this patent is extended or adjusted under 35 U.S.C. 154(b) by 1213 days.

(21) Appl. No.: 10/558,793

(22) PCT Filed: May 26, 2004

(86) PCT No.: PCT/JP2004/007546

§ 371 (c)(1),
(2), (4) Date: Nov. 28, 2005

(87) PCT Pub. No.: WO2004/106086

PCT Pub. Date: Dec. 9, 2004

(65) Prior Publication Data
US 2006/0260112 A1    Nov. 23, 2006

(30) Foreign Application Priority Data

May 27, 2003 (JP) .............................. 2003-149491
May 27, 2003 (JP) .............................. 2003-149512
May 27, 2003 (JP) .............................. 2003-149640

(51) Int. Cl.
*B23P 11/00* (2006.01)
(52) U.S. Cl. .................................... 29/441.2
(58) Field of Classification Search .............. 29/441.2, 29/442, 443, 439, 428, 505, 441.1; 401/216, 401/209, 212, 214, 215, 217
See application file for complete search history.

(56) References Cited

U.S. PATENT DOCUMENTS 5,520,473 A * 5/1996 Durham .................... 401/216
6,082,920 A   7/2000 Furukawa

FOREIGN PATENT DOCUMENTS

| GB | 814734 | 6/1959 |
|---|---|---|
| JP | 63252799 | 10/1988 |
| JP | 10315677 | 12/1998 |
| JP | 2002-331787 A | 11/2002 |
| TW | 528014 | 7/2000 |
| WO | WO9830401 | 7/1998 |

* cited by examiner

Primary Examiner—John C Hong
(74) Attorney, Agent, or Firm—Wood, Phillips, Katz, Clark & Mortimer

(57) ABSTRACT

A method for producing a tip unit for a liquid applicator including: a first process of shaping the contour of a tip body in the form of a truncated conical surface; a second process of forming a ball housing having an open end at its distal end in the tip body; a third process of placing a ball into the ball housing; a fourth process of scraping the peripheral side of the distal end portion of the tip body to form a peripherally scraped portion after the first process; and a fifth process of deforming the peripherally scraped distal end portion of the tip body toward the ball.

19 Claims, 13 Drawing Sheets

METHOD OF PRODUCING APPLICATOR TIP

BACKGROUND OF THE INVENTION

1. Technical Field

The present invention relates to a method for producing a tip unit for a liquid applicator such as a ball-point pen using water-based ink.

2. Background Art

A liquid applicator having a ball placed into its distal portion is conventionally known, wherein the ball transfers liquid, which adheres to the ball, onto the surface to be applied by being pressed. A typical example is a ball-point pen, which uses ink as the liquid. Inks of various kinds such as dyes or pigments dispersed in water, called "water-based inks" are known, as well as "water-based ball-point pens" containing such inks. "Water-based gel inks", i.e., gelatinized inks are also used. Some ball-point pens using water-based gel ink can deliver a relatively large rate of ink.

The tip unit incorporated in the ball-point pen includes a ball for writing rotatively retained in a tip body, and while the ball-point pen is used, the ball rolls to transfer the ink from an ink reservoir to the writing surface such as a paper through the ball.

The known tip unit for the ball-point pen will be described:

Referring to FIG. 23, which is a cross-section showing the distal portion of a tip unit 120, the tip unit 120 is mainly composed of a tip body 100 and a ball 102. The distal portion of the tip body 100 is shaped like a truncated cone as shown in FIG. 23. The ball 102 is retained in a ball housing (a socket) 103, and is held by the distal end portion 101 of the tip body 100.

As shown in FIG. 23, the tip body 100 is provided with the ball housing 103 shaped in concave at its distal end, and a capillary hole 110 at its proximal end. The ball housing 103 is provided with a ball resting seat or merely seat 105 having a conical inner surface. The tip body 100 is further provided with ink channels 107 each communicating with the seat 105. The ink channels 107 secure smooth flow of liquid when the ball-point pen is used. The liquid flows toward the distal end portion 101 through the capillary hole 110 along the ink channels 107. This construction keeps the liquid flow even with the ball 102 pushed toward the seat 105 in using the ball-point pen, so as to apply the liquid.

The known method for producing the tip unit 120 will be described:

First, as shown in FIG. 20, the tip body 100 is internally and externally drilled and shaped into a predetermined shape, and then, the ball housing 103, the capillary hole 110, and the ink channels 107 are formed. Subsequently, as shown in FIG. 21, the ball 102 is placed into the ball housing 103. Finally, as shown in FIG. 22, the tip body 100 is pressed at its distal end portion 101 by pressers 114, the pressed distal end portion 101 being faced to the ball 102.

The next step is a "tapping," wherein the ball 102 is lightly pressed down (or tapped) toward the seat 105 on its head. This tapping, as shown in FIG. 23, causes the surface of the seat 105 to be concave in compliance with the contour of the ball 102. As a result, in writing, the ball 102 is axially movable, thereby forming a gap S1 between the distal end portion 101 of the tip body 100 and the ball 102. The gap S1 is formed between the ball 102 and the open end of the tip body 100, so that the slightly heavier tapping makes the gap S1 wider. This fact is convenient for increasing the transfer of liquid.

In using the ball-point pen using the tip unit 120 for writing (applying), the ball 102 is pushed against a writing surface such as paper, running on the surface in accordance with moving of the pen, so that the liquid inside is applied onto the writing surface.

In the tip unit 120 tapped as described above, the ball 102 is axially movable, so as to tend to move backward along the axis by being pushed by the writing surface, in writing. Thus, in using the pen for writing onto the writing surface, the distal end portion 101 of the tip body 100 moves forward relatively to the ball 102 therein. As a result, the distal end portion 101 of the tip body 100 is likely to come into contact with the writing surface, resulting in scratching the writing surface and preventing from smoothly running on the writing surface, especially when the pen is in a slant position for the writing surface.

In order to avoid contact of the distal end portion 101 with the writing surface when the pen is held in a slant position for the writing surface, the distal end portion 101 of the tip body 100 must be thinned.

Reduction of the thickness of the distal end portion 101 avoids contact of the distal end portion 101 with the surface in a slant position of the pen, but it is difficult to machine the thin distal end portion 101 in the pressing process, and the pressing is likely to deform the portion needless to be deformed. Consequently, a method for producing a tip unit having a uniform and stable shape after pressing has been desired even when the distal end portion 101 is thin.

Especially, when the ball 102 has a small outer diameter, the distal end portion 101 must be more thinned; otherwise, the distal end portion 101 tends to come into contact with the writing surface in applying in a slant position. Thus, the smaller the outer diameter of the ball 102, the thinner the distal end portion 101 becomes, and therefore, the thin distal end portion 101 of the tip body 100 is difficult to be machined.

Furthermore, after the tip unit 120 is tapped, as described above, the ball 102 moves backward along the axis when the pen is used. At this stage, the gap S1 around the ball 102 becomes wider proportionally to the inclination of an inside surface K (FIG. 23) of the distal end portion 101 of the tip body 100 for the same amount of displacement to the backward of the ball 102. Therefore, in order to increase the rate of liquid discharge, the inclination of the inside surface K should be increased. In order to incline the inside surface K more, as shown in FIG. 22, it is necessary to make an angle of inclination of a portion to be deformed in the pressing process larger by using a presser 114 having a pressing surface 114a that has a larger inclination. However, this case has a problem in that a portion out of contact with the presser 114 may be undesirably deformed because of excessive deformation in the pressing process.

The present invention is directed to solve the difficulties discussed above, and to provide a method for readily producing a tip unit for a liquid applicator with the distal end portion 101 by a stable machining.

SUMMARY OF THE INVENTION

According to one aspect of the present invention, there is provided a method for producing a tip unit for a liquid applicator, wherein the tip unit includes a tip body having a ball housing and a ball, the ball housing having an opening at a distal end of the tip body and holding the ball therein, the method including: a first process (external machining process); a second process (internal machining process); a third process (ball placing process); a fourth process (peripheral scraping process); and a fifth process (distal-end deforming process). In this specification, numeral classifiers such as "first" are numbered only for differentiation and do not correlate with the sequencing of the processes.

In the first process or the external machining process, the contour of the tip body is shaped in the form of a substantially truncated conical surface. In the second process or the internal machining process, the ball housing is formed in the tip body. In the third process or the ball placing process, the ball is placed into the ball housing. In the fifth process or the distal-end deforming process, the distal end portion of the tip body is deformed toward the ball. In the fourth process or the peripheral scraping process in the present aspect, the peripheral side of the distal end portion of the tip body is scraped after the first process, and then the peripherally scraped distal end portion is deformed toward the ball in the fifth process.

The present aspect includes the fourth process of scraping the peripheral side of the distal end portion of the tip body and the fifth process of deforming the peripherally scraped distal end portion toward the ball, thereby enabling easy deformation of the scraped portion and easy deformation of only the portion to be deformed. This fact stabilizes the machining in producing the tip body.

In the embodiment, the fourth process can include differentiating the shapes of the side surfaces of a first surface and a second surface so that the second surface resides nearer to the distal end of the tip body than the first surface, the first surface being a truncated conical surface, the second surface being another truncated conical surface or a cylindrical surface, and the fifth process including enlarging the angle at which the first surface and the second surface intersect in a plane passing through the axis of the tip unit. Herein, the truncated conical surface is of a shape of a cone without its distal end portion and of a shape of a trapezoid in a cross-section axially in parallel; that is, a trapezoidal rotating body.

This method facilitates operations of peripherally scraping and distal-end deformation.

In the embodiment, the fifth process can include pressing the distal end portion of the tip body by means of a slant surface of a presser moved axially of the tip body until the slant surface comes into contact with the first surface, thereby deforming at least a part of the second surface in compliance with the contour of the slant surface. Herein, "pressing until the slant surface comes into contact with the first surface" is to press just until a part of the slant surface comes into contact with a part of the first surface, and needs not to press until the slant surface comes into contact with the entire first surface.

According to this method, the first surface functions as a target for positioning, and pressing such that the presser comes into contact with the first surface facilitates its positioning, and whereby the machining is stabilized.

Further, the fifth process can include deforming the distal end portion of the tip body such that the angle between the first surface and the second surface in a cross-section passing through the axis of the tip unit is in the range of 170° to 190°, preferably at 180° to make the first surface substantially flush with the second surface.

Herein, "the angle between the first surface and the second surface in a cross-section passing through the axis of the tip unit" is an angle of the peripherally scraped portion; that is, an angle of the outside of the tip unit.

According to this method, pressing the presser onto the entire second surface facilitates its positioning, and whereby the machining is stabilized.

Further, the fifth process can include pressing the distal end portion of the tip body such that the portion deformed by the process can have a shape of a truncated conical surface, and that the rear edge of the first surface lies in an imaginary extension of the conical surface.

According to this method, in the distal-end deforming process, contact of the presser with the rear edge of the first surface facilitates its positioning, and whereby the machining is stabilized.

Furthermore, the fourth process can include machining the first surface into an outwardly curved surface, to which the rear edge of the first surface flatly extends with no corner. This case enables the rear edge to have no scratch, ensuring smooth writing.

The method can further include a sixth process or a diameter enlarging process of making the inner diameter of the distal end of the tip body larger than that of the ball housing.

This method has the sixth process, thereby making the distal end portion to be inclined more in the pressing process thereof, and as a result, the space within the ball housing after the pressing is enlarged more.

Furthermore, the sixth process can include using a forming tool to perform the process, thereby facilitating the machining of the sixth process.

The method can further include a seventh process or a channel broaching process of broaching (forming) a channel at the rear end of the ball housing, the channel extending axially of the tip body, thereby increasing the rate of liquid discharge.

The method can further include an eighth process or a seat deforming process of deforming the rear end of the ball housing by pressing the ball from the distal end of the tip body. According to this method, the ball is axially movable, so that the gap around the distal end portion is enlarged to increase the rate of liquid discharge in using a liquid applicator.

Still further, the second process can include producing a ball resting seat projecting toward the distal end portion of the tip body, and the eighth process can include deforming the seat to form a deformed surface. According to this method, the seat is deformed with smaller strength of force in the eighth process.

The second process can further include projecting the inside surface of the seat toward the distal end of the tip body, thereby facilitating to deform a pressure deformation surface.

The second process can further include processing the ball resting seat such that it has a shape of a truncated conical surface with its apex toward the distal end of the tip unit, thereby facilitating the machining in the second process.

A tip unit produced by the above-mentioned embodiments (methods) and a liquid applicator incorporating the tip unit can be used. Further, the ball can be urged toward the distal end portion of the tip body. Still further, a ballpoint pen incorporating the tip unit can use water-based inks or water-based gel inks as liquid to be applied.

DESCRIPTION OF PREFERRED EMBODIMENTS

Figure 1A:
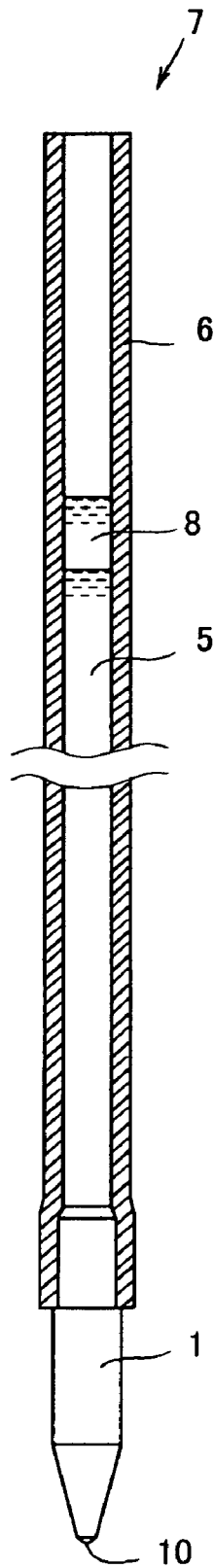
FIG. 1A is a cross-section showing a core unit having a tip unit produced in the embodiment of the present invention.
Figure 1B:
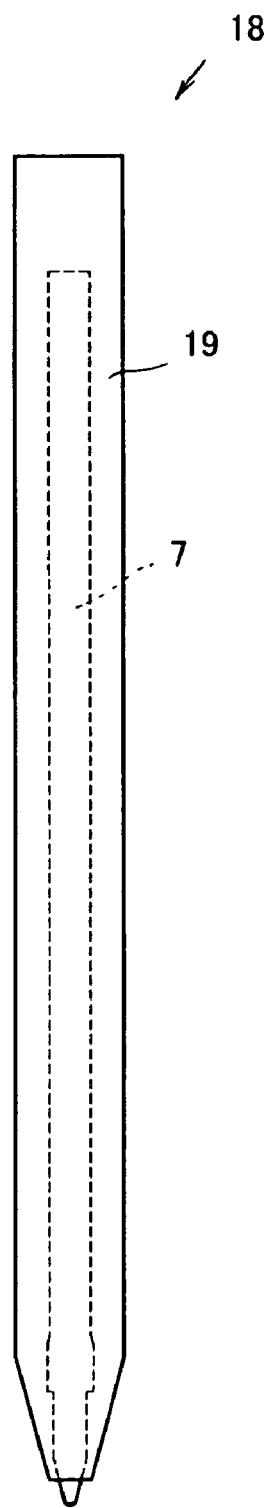
FIG. 1B is a front view showing a ball-point pen using the core unit shown in FIG. 1A.

FIG. 1A generally shows a core unit 7 including a tip unit 1 used in a ball-point pen (viz. liquid applicator) 18 in the first embodiment of the present invention. The tip unit 1 is installed in the core unit 7 at the distal portion thereof. The tip unit 1 is connected to an ink cylinder (a reservoir of the liquid to be applied) 6 containing ink 5 (liquid to be applied) such as a water-based ink therein. Referring to FIG. 1B, the core unit 7 is inserted in a cylindrical shaft 19 of the ball-point pen 18.

A ball 10 retained in the distal portion of the tip unit 1 is pushed against a writing surface such as a paper, running on the surface in accordance with moving of the ball-point pen 18, so that the ink 5 used as liquid to be applied is led out through the tip unit 1, adhering to the ball 10 in appropriate amount, with the consequence that the ball-point pen 18 is used for writing. The tip unit 1 will be more specifically described by referring to FIG. 2:

The tip unit 1 includes a tip body 11 used for a ball-point pen or a liquid applicator, the ball 10 urged by an urging member 12.

The tip body 11 has a substantially conical shape in its distal portion and a substantially cylindrical shape in its proximal portion, entirely appearing to be a rocket. In other words, the tip body 11 has a conically-shaped head 25 near its distal portion, and a cylindrical shank 26 near its proximal portion. The cylindrical shank 26 has at its proximal end a connecting step portion 26a whose outer diameter is slightly reduced to be connected to the ink cylinder 6. The tip body 11 includes a ball housing (a socket) 15, a capillary hole 16, and a proximal bore 17, all of which mutually communicate so as to enable liquid to flow toward the ball 10. The proximal bore 17 is open in a proximal end opening 28.

Figure 4:
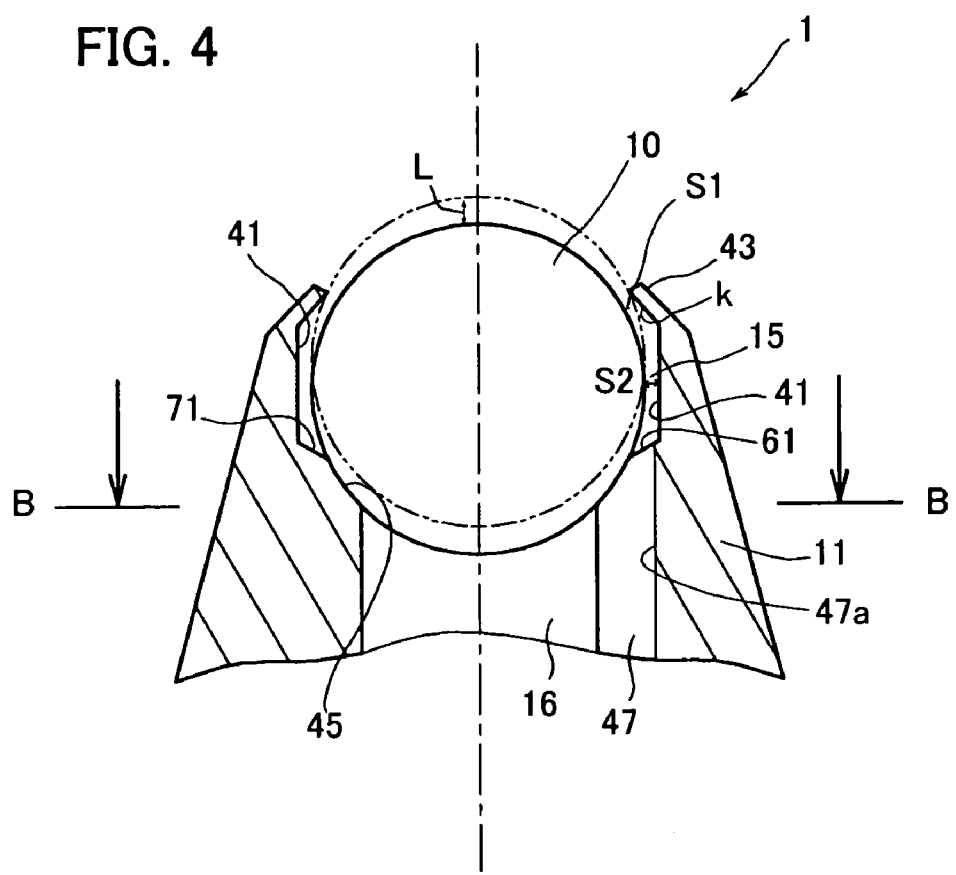
FIG. 4 is a cross-section on a larger scale showing the distal portion of the tip unit shown in FIG. 2.

Referring to FIG. 4, the ball housing 15 includes a cylindrical wall 41 having a shape of a cylindrical inner wall, a ball resting seat or merely a seat 45 that is located near the proximal end of the cylindrical wall 41, and a connecting surface 71 connecting the seat 45 to the cylindrical wall 41. As described below, the seat 45 is formed by tapping, or pressing the ball 10 from the distal end toward the proximal end. The connecting surface 71 has a shape of a truncated conical surface.

Figure 3:
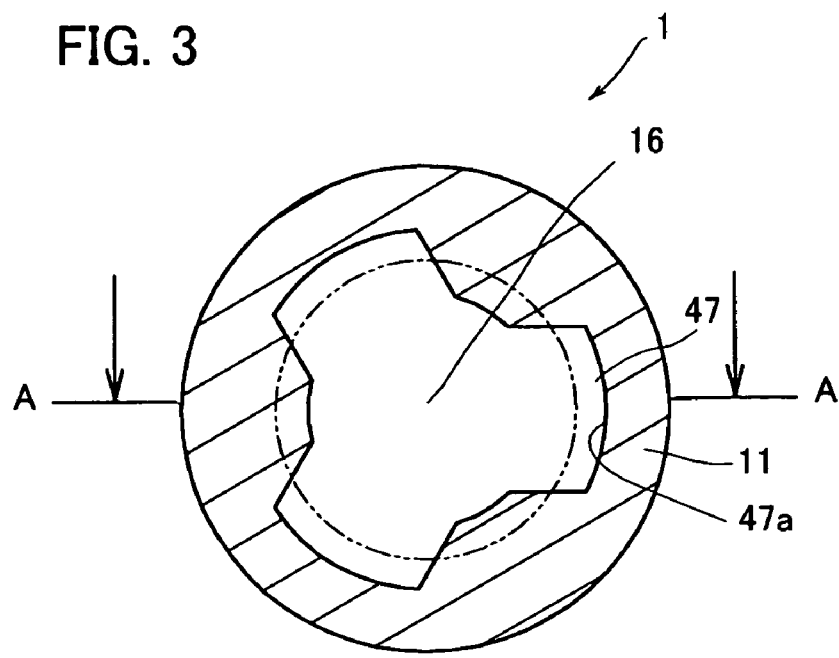
FIG. 3 is a cross-section showing the distal portion of the tip unit and thereabout shown in FIG. 2.

Furthermore, as shown in FIGS. 3 and 4, the tip body 11 has ink channels 47 axially arranged on its inside wall around the capillary hole 16, communicating with the ball housing 15 so as to allow ink 5 effluent from the ink cylinder 6 to flow from the capillary hole 16 through the ink channels 47 and further outlets 61 of the ink channels 47 at the ball housing 15 to the ball housing 15. The present embodiment has the three ink channels 47 in three places.

Figure 2:
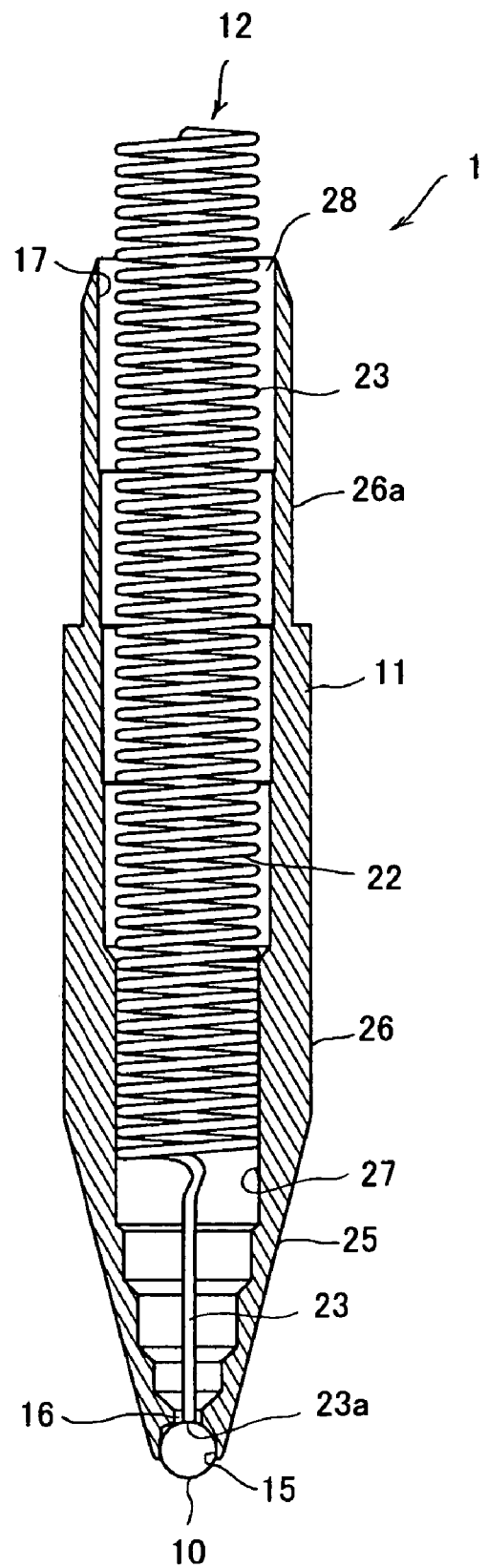
FIG. 2 is a cross-section showing the tip unit produced by a method embodying the present invention.

As shown in FIG. 2, the ball 10 is urged by the urging member 12, which includes a spring part 22 that is a spring coil and a bar part 23 whose distal end 23a comes into contact with the ball 10.

The urging member 12 is accommodated in the tip body 11 and is constantly in a compressed state so as to push the ball 10 toward the distal end. As a consequence, when the pen 18 is not in use, the force of the urging member 12 prevents the ink 5 from flowing out. When the pen 18 is in use, the urging force causes the ball 10 to withdraw against the force, so that the ink 5 flows out.

The ball 10 is spherical and is rotatively held in the ball housing 15 of the tip body 11. More specifically, the ball 10 is supported by the seat 45 at its bottom, by the cylindrical wall 41 on its side, and by a distal end portion 43 inwardly deformed at its head. As referred to below, the deformed distal end portion 43 is obtained by pressing the distal end of the cylindrical wall 41 of the tip body 11 inwards after the ball 10 being placed into the ball housing 15.

Figure 5:
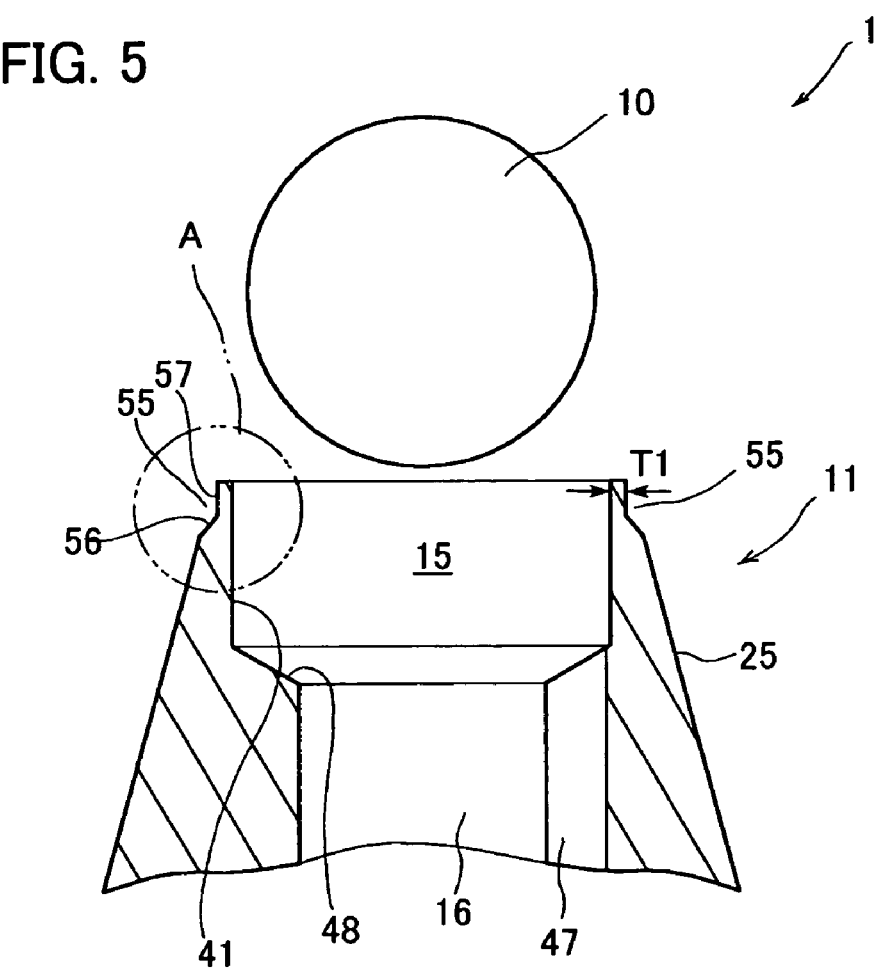
FIG. 5 is another cross-section showing the distal portion of the in-process tip unit produced by the first embodiment of the invention.

Now, the process for producing the tip unit 1 will be described by referring to FIGS. 5 to 10:

First, the tip body 11 is produced from a solid cylindrical metal material such as stainless steel, preferably capable of easily drilling and machining, such as free-cutting stainless steel (for example, DSR6F manufactured by Daido Special Steel Manufacturing Co., Ltd.), free-cutting white metal, or brass. The process includes, as described below, an external machining process, a peripheral scraping process, an internal machining process, and a channel broaching process. Initially, the cylindrical material is internally and externally cut to be machined. As machined, the distal portion of the tip body 11 is shaped as shown in FIG. 5.

The tip body 11 is subjected to the external machining process in the following manner:

The distal portion of the tip body 11 is shaped into a truncated conical surface whose imaginary extension converges at one point (apex) to produce the conically-shaped head 25. Other portions such as the shank 26 or the connecting step portion 26a, which are shown in FIG. 2, are formed in such shape as described above in the external machining process.

After the external machining process is finished, the peripheral scraping process is started, where a peripherally scraped portion 55 is formed by scraping a part of the outside of the distal portion of the conically-shaped head 25 of the tip body 11. The peripherally scraped portion 55 is formed at the entire circumferences to be like a ring.

As shown in FIG. 5, the formation of the peripherally scraped portion 55 forms a first surface 56 and a second surface 57 on the surface of the tip body 11.

The first surface 56 has a shape of a truncated conical surface with its apex towards the distal end and is less slant than the conically-shaped head 25. The second surface 57 is located ahead of the first surface 56, and has a shape of a cylindrical surface. Thus, the distal portion of the tip body 11 around the second surface 57 has a cylindrical shape and has substantially the same thickness therearound.

As a result of the formation of the peripherally scraped portion 55, the distal end portion of the tip body 11 becomes thinner in a radial direction relative to the central axis of the tip body 11. As shown in FIG. 5, the thickness T1 at the second surface 57 is in the range of 35 µm to 45 µm, and this range facilitates the following machining. The length of the second surface 57 can be determined as desired in accordance with lengths such as the outer diameter of the ball 10 and the width of the gap between the ball 10 and the ball housing 15.

The tip body 11 is internally machined in the following manner:

An inside of the tip body is axially drilled to form the ball housing 15 and the capillary hole 16 in the internal machining process. The ball housing 15 and the capillary hole 16 each have a circular cross-section perpendicular to an axis after drilling. The ball housing 15 is open in its distal end, and is surrounded with the cylindrical side surface 41. The cylindrical side surface 41 and the capillary hole 16 are connected by a seat-side machined surface 48. The proximal bore 17 shown in FIG. 2 is formed by being drilled from the proximal end of the tip body 11.

The internal machining process for the formation of the ball housing 15 and the peripheral scraping process for the formation of the peripherally scraped portion 55 by scraping a part of the outside of the distal end portion of the conically-shaped portion 25 of the tip body 11 can be performed simultaneously or separately. The simultaneous operation of the two processes is advantageous in that it facilitates the process of thinning around the second surface 57 because the two operations are performed by sharing the working center.

Then, the stage proceeds to the channel broaching process for broaching the ink channel or channels 47. The present embodiment illustrated in FIG. 3 has three ink channels 47 at equal angular intervals. Each of the ink channels 47 communicates with the capillary hole 16, and is formed by cutting the side wall of the capillary hole 16 outwards in the form of an axially extending recess. As shown in FIG. 4, a recessed wall 47a of each of the ink channels 47 is substantially flush with the cylindrical wall 41 of the ball housing 15.

Figure 7:
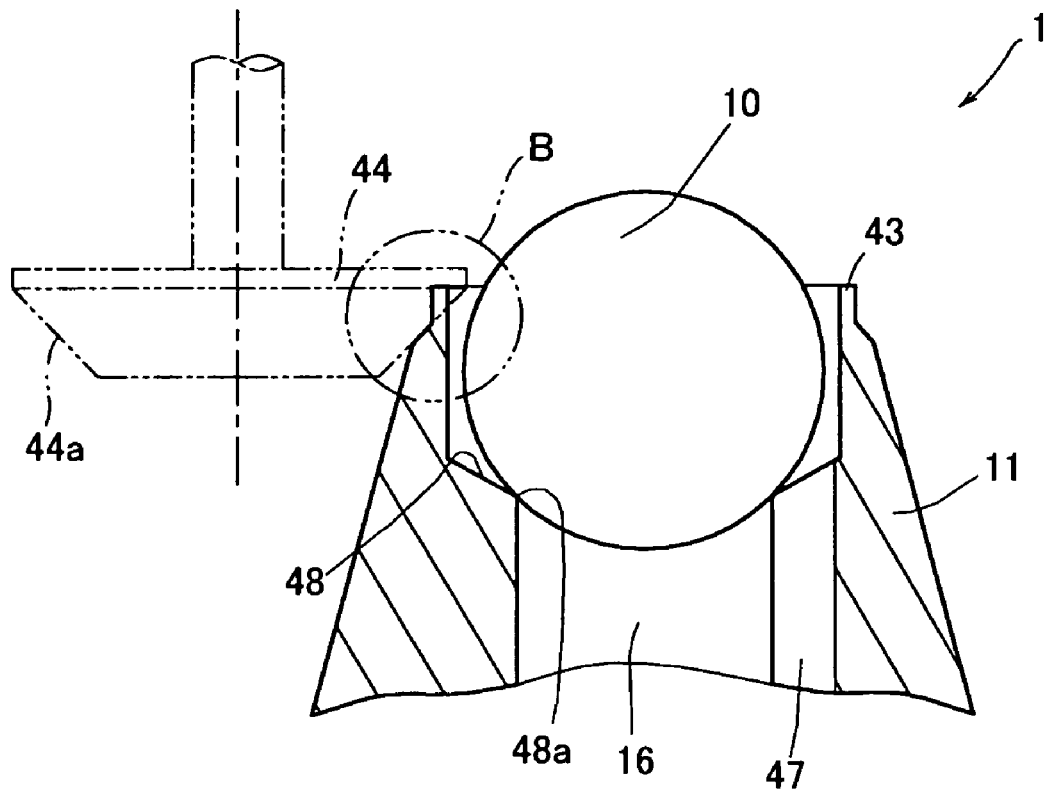
FIG. 7 is still another cross-section showing the distal portion of the in-process tip unit produced by the first embodiment of the invention.
Figure 9:
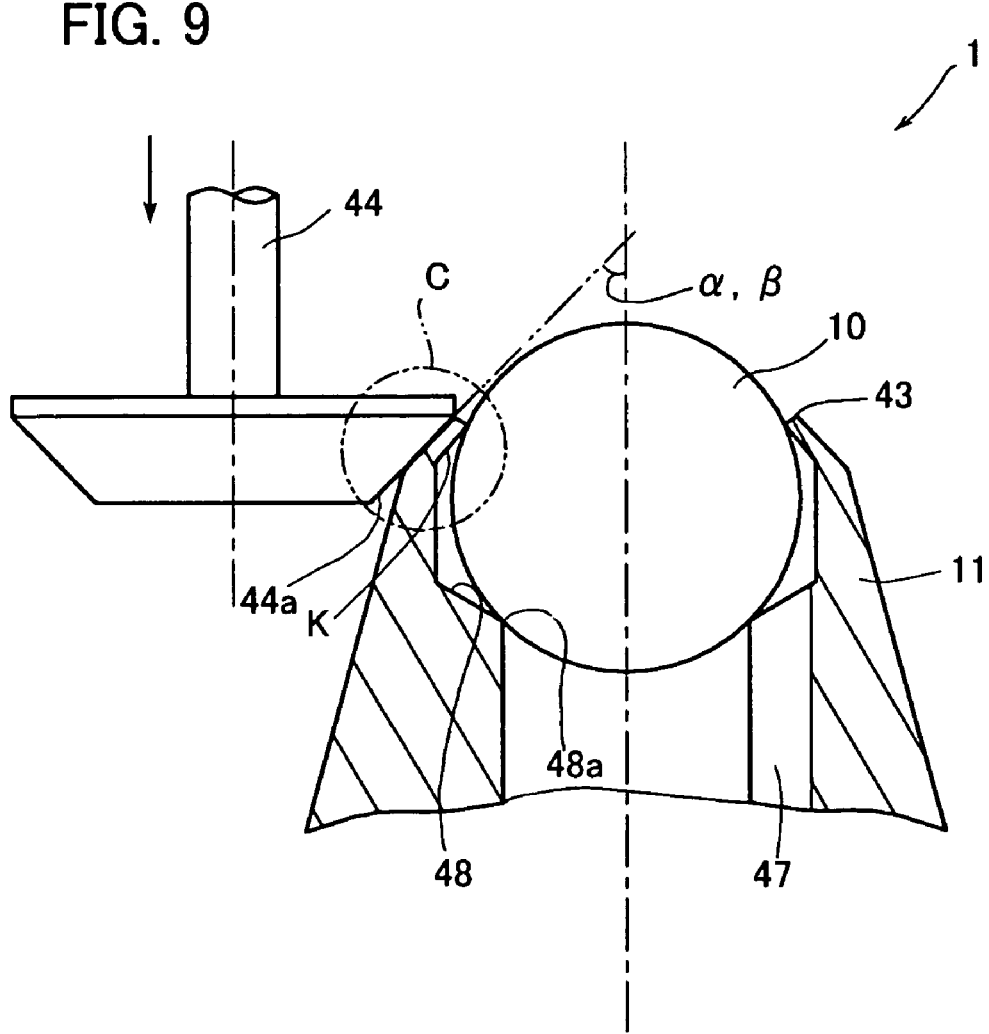
FIG. 9 is yet another cross-section showing the distal portion of the in-process tip unit produced by the first embodiment of the invention.
Figure 21:
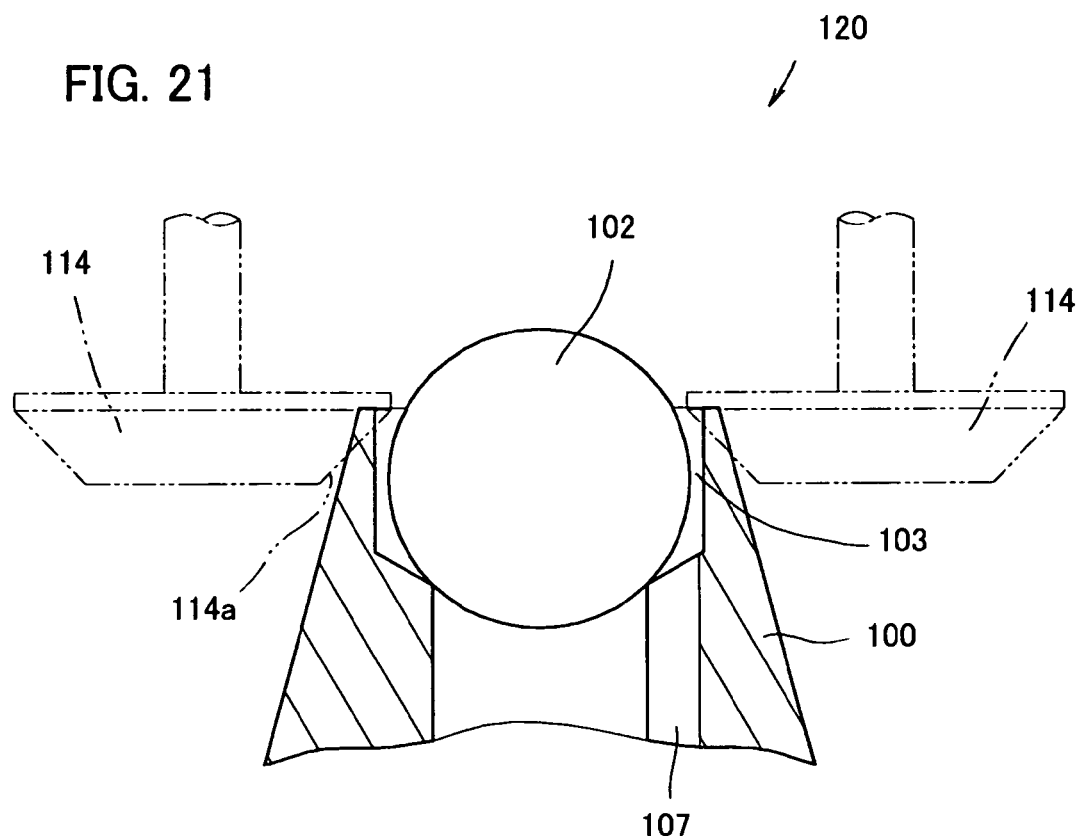
FIG. 21 is another cross-section of the distal portion of the in-process tip unit produced by the known method.
Figure 22:
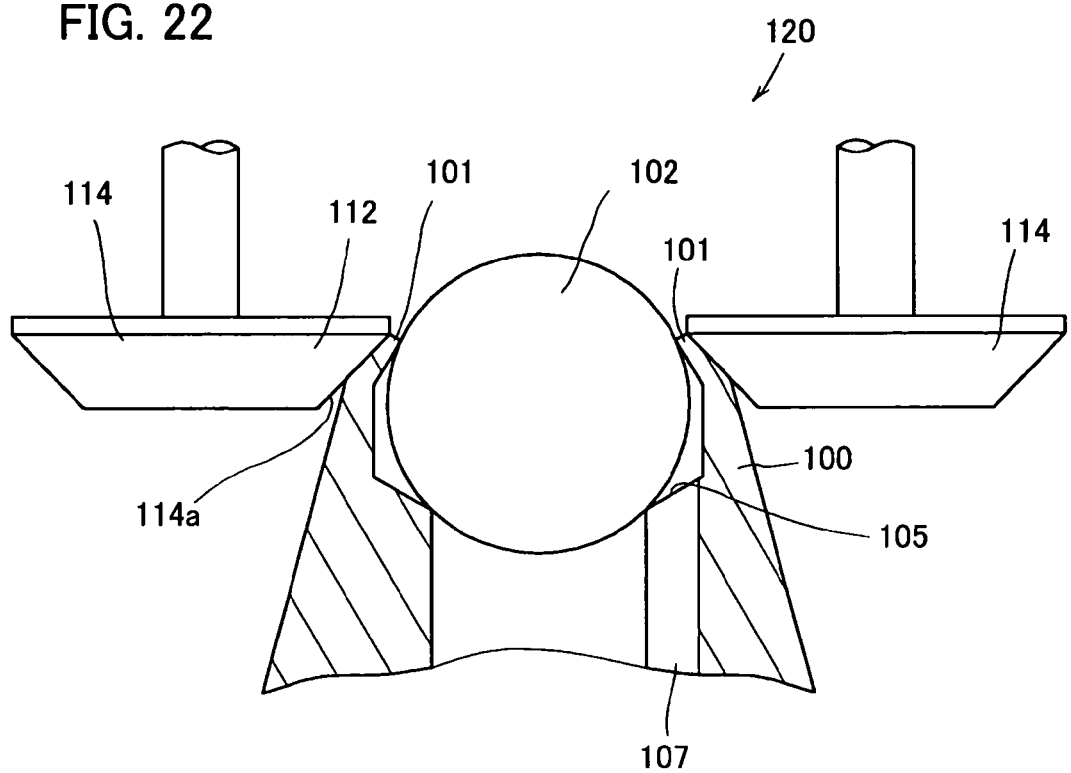
FIG. 22 is still another cross-section of the distal portion of the in-process tip unit produced by the known method.
Figure 23:
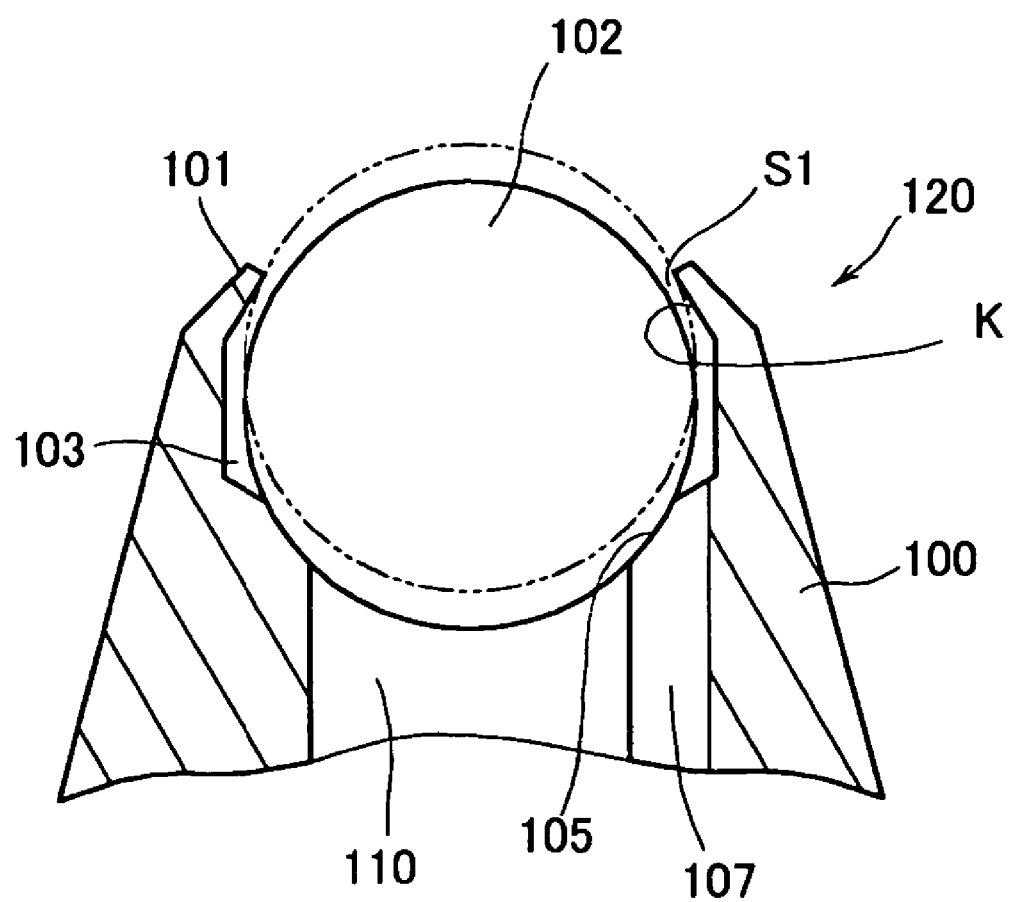
FIG. 23 is yet another cross-section of the distal portion of the tip unit produced by the known method.

The next stage is a ball placing process where the ball 10 is placed into the ball housing 15. Then, as shown in FIGS. 7 and 9, the distal end portion of the tip body 11 is deformed inwards (toward the ball 10) so as to obtain the deformed distal end portion 43. This stage is called "the distal-end deforming process" for convenience. This process is performed by use of a presser 44 having a slant portion 44a. More specifically, while the ball 10 rests on the seat-side machined surface 48, the slant portion 44a of the presser 44 is brought into contact with the distal end of the tip body 11 by driving the presser 44 in the axial direction. Machining by use of the presser 44, as shown in FIGS. 21 and 22 used for the description of the background art, requires a plurality of the pressers 44, but the drawings used for the description of the embodiments of the invention illustrate only a single presser for simplicity.

Then, the distal-end deforming process is to deform the distal end portion 43, and to make its inside surface K slanted. In addition, the distal end portion 43 is pressed toward the ball 10 by the pressers 44 to be deformed. At this time, the inside surface K is pressed until the top end of the surface K comes into contact with the ball 10. Thus, at a state just after the process, no gap occurs between the top end of the surface K and the ball 10, and therefore, the ball 10 is stopped from moving in an axial direction.

In this specification, "deform" or "deformation" does not mean that the object is spoiled but means that it is changed in shape.

Figure 6:
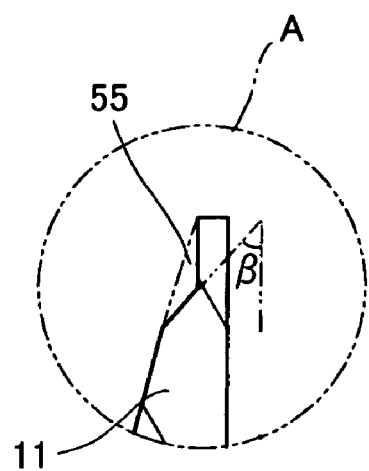
FIG. 6 is a fragmentary view on a larger scale of the spot A shown in FIG. 5.
Figure 8:
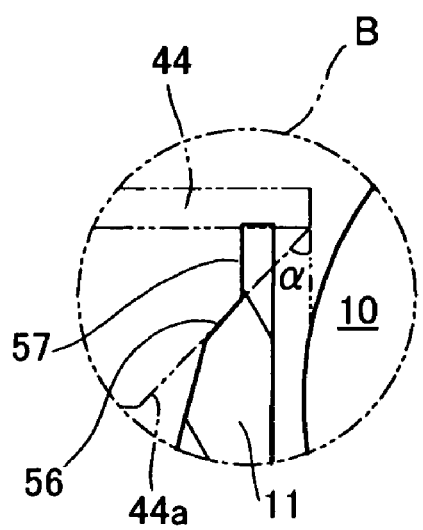
FIG. 8 is a fragmentary view on a larger scale of the spot B shown in FIG. 7.
Figure 10:
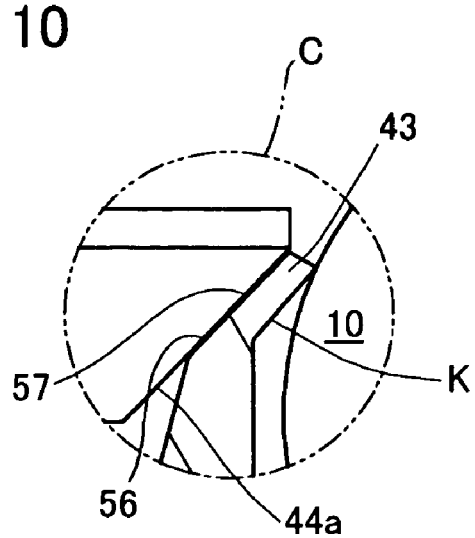
FIG. 10 is a fragmentary view on a larger scale of the spot C in FIG. 9.

Referring to FIGS. 6, 8, and 10 on a larger scale of the distal portion of the tip body 11, the distal-end deforming process will be more specifically described:

The shape of the tip body 11 prior to the distal-end deforming process is shown in FIGS. 6 and 8, wherein FIG. 8 shows that the presser 44 is kept full contact with the tip body 11. In the present embodiment, an angle of inclination of the slant portion 44a of the presser 44 in a cross-section passing through the axis of the tip unit 1 is substantially the same as that of the first surface 56; as shown in FIG. 9, the angle of inclination of the slant portion 44a $\alpha$ (FIG. 8) and that of the first surface 56 $\beta$ (FIG. 6) to the axis of the tip unit 1 are the same.

As shown in FIG. 10, when the presser 44 comes into contact with the tip body 11, the distal end portion of the tip body 11 is deformed toward the ball 10, thereby deforming the distal end portion 43. The second surface 57 is wholly reshaped along the slant portion 44a of the presser 44, thereby ensuring that the angle becomes large between the first surface 56 and the second surface 57 in the above-described cross-section.

When the slant portion 44a moves to a position where it comes into contact with the first surface 56, the first surface 56 and the second surface 57 come to be substantially flush with each other, which means that the angle therebetween becomes substantially 180°. The first surface 56 and the second surface 57 are finished to assume a single conical surface. Thus, the distal-end deforming process is finished. The angle between the first surface 56 and the second surface 57 can be in the range of 170° to 190°. The first surface 56 can be curved.

Then, the ball 10 is lightly pressed from the distal end by "tapping", thereby deforming into a spherical inner surface to form the ball resting seat 45 inwardly curved. More specifically, the machined surface 48 contacting with the bottom of the ball 10 is partly deformed to obtain the seat 45 by pressing the ball 10 in the state shown in FIG. 9 from the distal end toward the proximal end. The final shape is shown in FIG. 4.

The hardness of the ball 10 is in the range of 1500 to 2000 Hv, and that of the ball housing 15 is in the range of 200 to 280 Hv. Since the ball 10 is harder than the ball housing 15, the machined surface 48 of the ball housing is deformed in compliance with the spherical contour of the ball 10. Thus, the seat 45 is shaped in compliance with the spherical contour of the ball 10. In this way, the tip unit 1 is finished as shown in FIG. 4.

As the tip unit 1 in the present embodiment is tapped, the ball 10 moves over a distance (deformed amount) L in an axial direction as shown in FIG. 4. When the ball 10 moves backward, as shown in FIG. 4, a gap S1 exists between the ball 10 and the distal end portion 43 of the tip body 11. When the ball-point pen 18 is used in writing, the ball 10 is pushed back toward the seat 45, the gap S1 is formed.

As shown in FIG. 2, the ball 10 is urged toward the distal end by means of the urging member 12. Then, as shown in FIG. 1A, the ink cylinder 5 is installed and the ink 5 is filled therein, so as to obtain the core unit 7. Finally, as shown in FIG. 1B, the core unit 7 is encased in the cylindrical shaft 19. Thus, the ball-point-pen 18 is finished, wherein the core unit 7 has an ink follower 8 in the proximal end of the ink cylinder 6.

The ink follower 8 can be made of non-volatile or less-volatile organic gel, such as one or more substances selected from the group consisting of silicon oils, mineral oils, and polybutene. The ink follower 8 made of such substances allows the ink 5 to flow smoothly even when ink is discharged in a relatively large rate.

When the pen 18 is used in writing, the ball 10 is pushed against the writing surface such as a paper, and running on the surface under the pressure while moving toward the seat 45. The ink 5 is led out through the capillary hole 16; that is, through the gap S1 via the ink channels 47 and the ball housing 15, adhering to the writing surface.

The method embodying the present invention can ensure a stable production of tip units because of the fact that the peripherally scraped portion 55 formed at the tip body 11 advantageously fixes the position to be deformed.

The thickness of the tip body 11 around the peripherally scraped portion 55 is thinner than any other portion thereof, and therefore, the portion 55 is deformed more readily than the other portions when machined in the distal-end deforming process. This easy deformability leads to the easy machining in the process even if the planned deformation of the distal end portion 43 is large, and even if the portion to be deformed is liable to shift because of thinness of the entire portion.

The tip unit 1 produced by the method embodying the invention has a relatively short distal end portion 43, and a steeply slant inside surface K to enable the ink 5 to smoothly flow out, thereby ensuring a stable machining.

Figure 11:
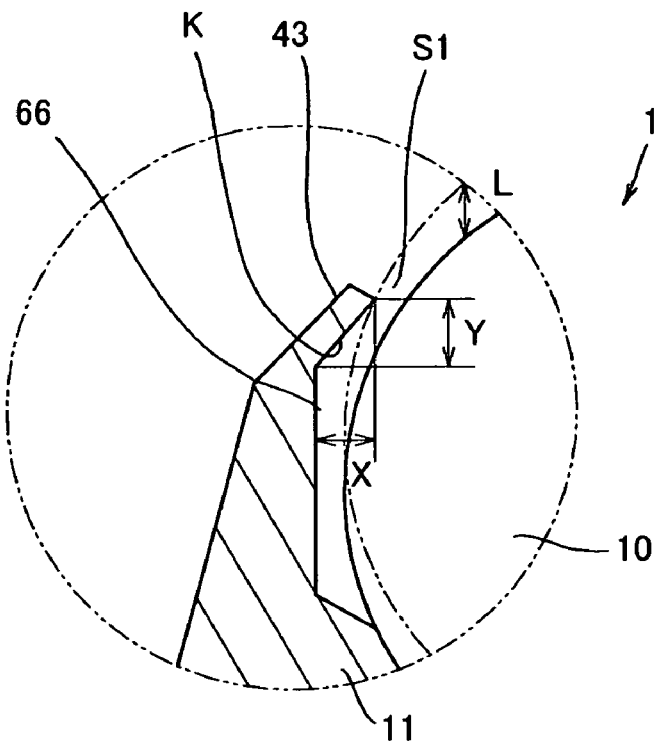
FIG. 11 is a cross-section showing the distal portion of a modified version of the tip unit according to the first embodiment of the invention.

The operation will be more specifically described by reference to FIGS. 11 and 12:

FIG. 11 is an enlarged view of a spot around the gap S1 of the tip unit 1. The distal end portion 43 has a diametric depth X and an axial depth Y, wherein X is longer than Y, which means that the inside surface K is more inclined to the axis of the tip body 1.

Figure 12:
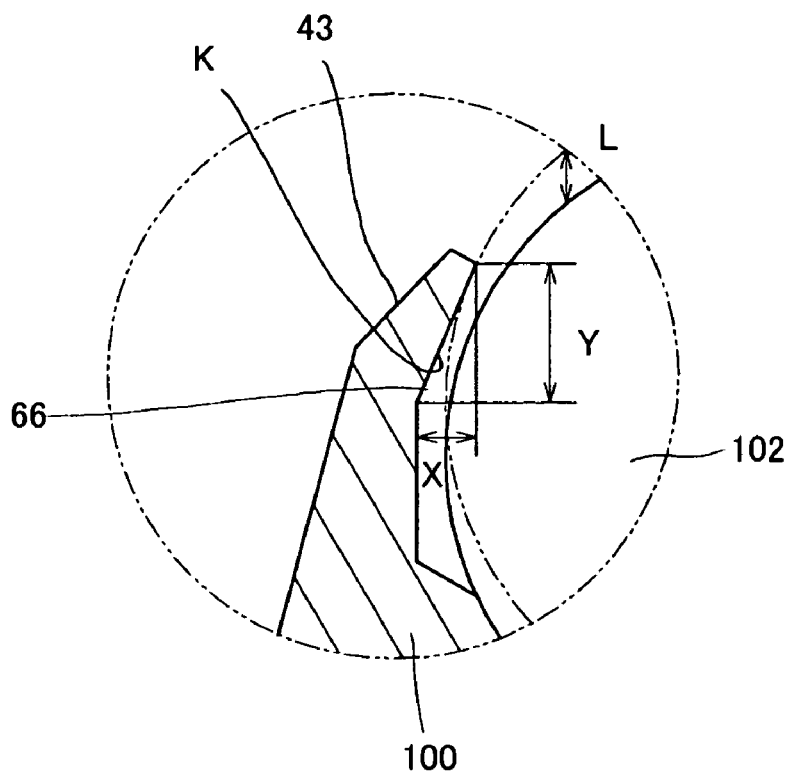
FIG. 12 is a cross-section showing the distal portion of the known tip unit.

FIG. 12 is an enlarged view of a spot around a gap S1 of the known tip unit 120. The known tip unit 120 is processed by a presser 44 (not shown) having a slant portion 44a having the same angle of inclination as that in the present embodiment. However, the known tip unit 120 has no peripherally scraped portion 55, which is formed in the tip unit 1 in the present embodiment shown in FIG. 11, and therefore, a distal end portion 43 is liable to be longer. Thus, according to the known tip unit 120, an inside surface K has no choice but to have a reduced angle of inclination. This means that an axial depth Y is relatively large for a diametric depth X in the distal end portion 43 of the surface K. As a result, the gap S1 and space of a ball housing 15 each become small for the same distance L over which a ball 10 moves as that in the present embodiment, resulting in irregular flow of ink 5.

In contrast, the tip unit 1 produced by the method according to the present embodiment has the inside surface K having a large angle of inclination, the gap S1 capable of being widened, and the ball housing 15 having a larger space 66, thereby securing the smooth flow of the ink 5. In addition, the distal-end deforming process is performed in a stable manner by the above-mentioned method.

Furthermore, the tip unit 1 produced by the present embodiment has the gap S1 capable of being widened even if the distance L over which the ball 10 moves is short. As shown in FIG. 4, the delivery of the ink 5 can be restricted through the gap S2 where the ball 10 is nearest to the cylindrical wall 41 of the ball housing 15. In this case, the flow rate is regulated through the gap S2 determined by the diameters of the ball 10 and the cylindrical wall 41 of the ball housing 15 both precisely machined, thereby reducing uneven ink delivery depending on the products.

In the embodiment of the invention, the pressers 44 can constantly move over the same distance in deforming the distal end portion 43 in the distal-end deforming process. More specifically, the pressers 44 are moved until their slant portions 44a come into contact with the first surface 56 of the tip body 11, and therefore, this point can be used as the critical position at which the pressers 44 are stopped.

Other modified embodiments of the present invention will be described below:

FIGS. 13 to 15 show tip bodies 70, 71, and 72 all of which are different from the tip body 11 in the above-mentioned embodiment.

A second embodiment (method) uses the tip body 70 (FIG. 13), and a third embodiment (method) uses the tip body 71 (FIG. 14). These methods are different from the first embodiment in that the second and third methods produce the tip unit 1 by changing the angle of inclination α of the slant portion 44a of the presser 44 and the angle of inclination β of the first surface 56 of the peripherally scraped portion 55. A fourth embodiment (method) uses the tip body 72 (FIG. 15). This method is different from the above-mentioned methods in that it produces the tip unit 1 after the distal end portion 43 is partly scraped to form a scraped inside portion 79 in a "diameter enlarging process". Except for the distal end portion 43, the tip bodies 11, 70, 71, and 72 produced by the first, second, third and fourth embodiments have the same structure.

Figure 13A:
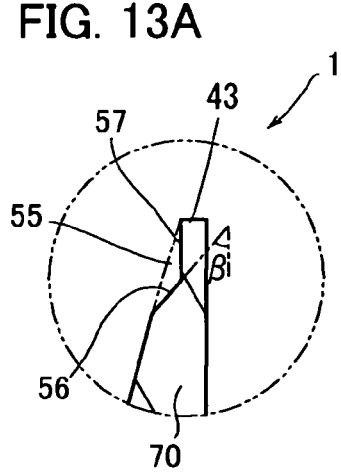
FIG. 13A is a cross-section showing the distal portion of a pre-press tip unit produced by the second embodiment of the invention.
Figure 13B:
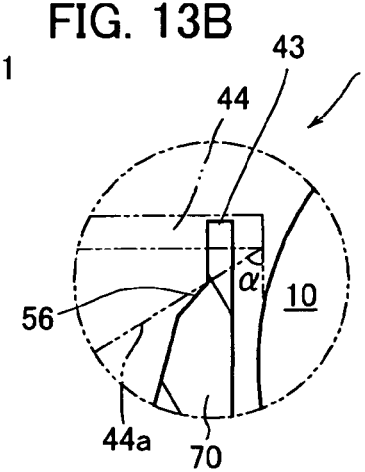
FIG. 13B is another cross-section showing the distal portion of the pre-press tip unit produced by the second embodiment of the invention.
Figure 13C:
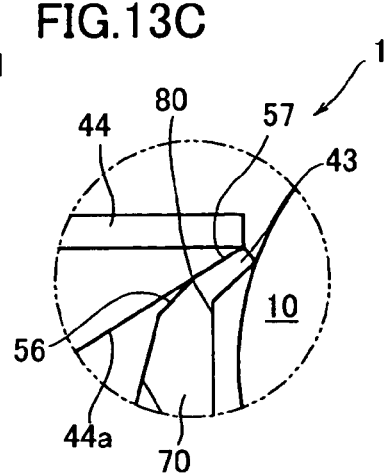
FIG. 13C is still another cross-section showing the distal portion of the post-press tip unit produced by the second embodiment of the invention.

Each of the second, third and fourth embodiments will be more specifically described below:

The second embodiment uses the tip body 70 shown in FIG. 13A. As shown in FIGS. 13B and 13C, the slant portion 44a of the presser 44 used in the distal-end deforming process for deforming the distal end portion 43 has a different angle of inclination from the first surface 56 of the peripherally scraped portion 55 of the tip body 70. More specifically, an angle of inclination α of the slant portion 44a to the axis of the tip unit 1 is larger than an angle of inclination β of the first surface 56 of the peripherally scraped portion 55 to the axis of the tip unit 1.

The distal end portion 43 is deformed in the distal-end deforming process by the method of producing the tip unit 1 in the second embodiment. More specifically, as shown in FIG. 13C, the slant portion 44a is brought into contact with a distal edge 80 of the first surface 56, whereupon the distal end portion 43 is deformed in such a manner that the second surface 57 is reshaped in compliance with the contour of the slant portion 44a.

At this stage, the angle of inclination of the second surface 57 is larger than that of the first surface 56, and the angle at which the first surface 56 and the second surface 57 intersect in a cross-section passing through the axis of the tip unit 1 is 180° or more.

Figure 14A:
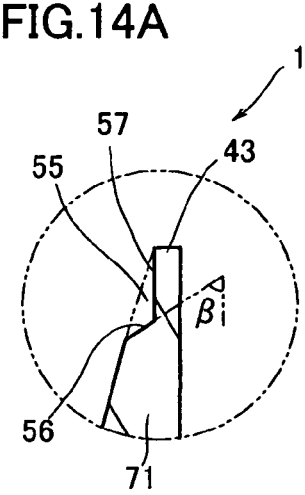
FIG. 14A is a cross-section showing the distal portion of a pre-press tip unit produced by the third embodiment of the invention.
Figure 14B:
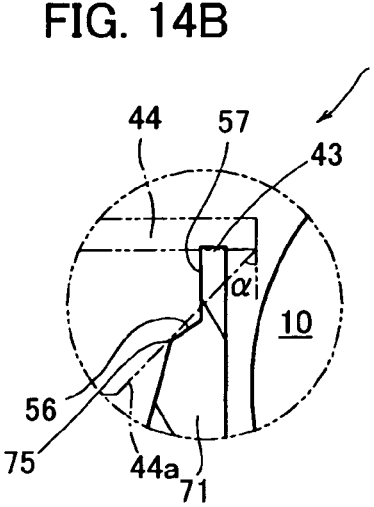
FIG. 14B is another cross-section showing the distal portion of the pre-press tip unit produced by the third embodiment of the invention.
Figure 14C:
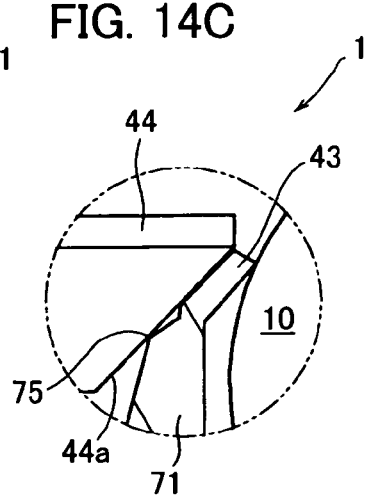
FIG. 14C is still another cross-section showing the distal portion of the post-press tip unit according to the third embodiment of the invention.

The third embodiment uses the tip body 71 shown in FIG. 14A. As shown in FIGS. 14B and 14C, the slant portion 44a of the presser 44 used in the distal-end deforming process for deforming the distal end portion 43 has a different angle of inclination from the first surface 56 of the peripherally scraped portion 55 of the tip body 71. More specifically, an angle of inclination α of the slant portion 44a to the axis of the tip unit 1 is smaller than an angle of inclination β of the first surface 56 of the peripherally scraped portion 55 to the axis of the tip unit 1.

The distal end portion 43 is deformed in the distal-end deforming process by the method of producing the tip unit 1 in the third embodiment. More specifically, as shown in FIG. 14C, the slant portion 44a is brought into contact with a proximal edge 75 of the first surface 56, whereupon the distal end portion 43 is deformed in such a manner that the second surface 57 is reshaped in compliance with the contour of the slant portion 44a.

At this stage, the second surface 57 is reshaped in compliance with the contour of the slant portion 44a to form a deformed surface. The distal end portion 43 has a shape of a truncated conical surface, and the proximal edge 75 of the first surface 56 positions on an imaginary plane of the deformed surface.

The presser 44 is positioned such that its slant portion 44a comes into contact with the proximal edge 75 of the first surface 56.

Figure 15A:
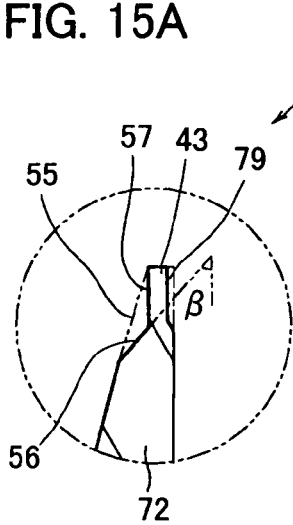
FIG. 15A is a cross-section showing the distal portion of a pre-press tip unit produced by the fourth embodiment of the invention.

The fourth embodiment uses the tip body 72 shown in FIG. 15A. The tip body 72 is processed in the same manner as the tip body 11 in the first embodiment. In addition, a scraped inside portion 79 is also formed in the diameter enlarging process to make the inside diameter of the distal portion of the tip body 72 larger than that of the ball housing 15. The diameter enlarging process is performed by cutting by use of a forming tool, for example a woodruff tool (or gundrill tool), or other cutting tools.

The diameter enlarging process and the above-mentioned internal machining process for forming the ball housing 15 can be simultaneously performed. More specifically, a cutting tool used in machining the inside of the tip unit 1 can be used in machining the scraped inside portion 79, wherein the distal end of the tool is supposed to agree to the inner diameter of the cylindrical wall 41 while the proximal end is supposed to agree to the inner diameter of the scraped inside portion 79, whereby the portions are cut and machined. The simultaneous processes simplify the processes. In addition, the central axis of the scraped inside portion 79 formed by the diameter enlarging process and that of the cylindrical wall 41 formed by the internal machining process is readily aligned, thereby securing the precise performance of the processes.

Finally, the tip body 72 is pressed by the presser 44 so as to deform the distal end portion 43 in the same manner as the distal-end deforming process in the present embodiment.

Figure 15B:
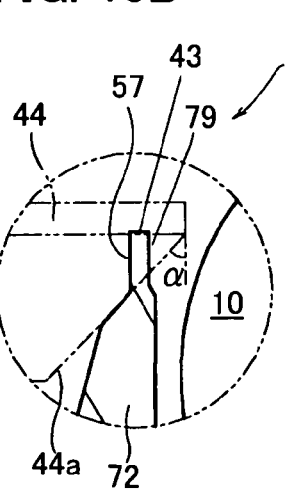
FIG. 15B is another cross-section showing the distal portion of the pre-press tip unit produced by the fourth embodiment of the invention.
Figure 15C:
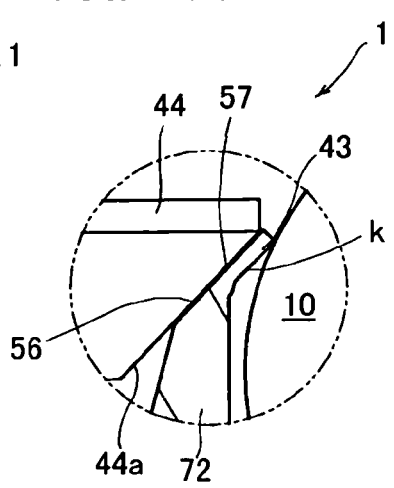
FIG. 15C is still another cross-section showing the distal portion of the post-press tip unit produced by the fourth embodiment of the invention.

As shown in FIGS. 15B and 15C, the angle α at which the slant portion 44a of the presser 44 is inclined to the axis of the tip unit 1 of the tip body 72 is equal to the angle β at which the first surface 56 of the peripherally scraped portion 55 is inclined to the axis of the tip unit 1.

According to the fourth embodiment, as shown in FIG. 15C, the distal end portion 43 is deformed such that the second surface 57 is reshaped in compliance with the contour of the slant portion 44a.

Before the distal-end deforming process is performed, as shown in FIG. 15B, the distance between the ball 10 and the distal end portion 43 can be large owing to the scraped inside portion 79, and therefore, as shown in FIG. 15C, the inside surface K of the distal end portion 43 can be more inclined when the distal end portion 43 is deformed by the distal-end deforming process.

The first surface 56 and the second surface 57 formed by the peripherally scraped portion 55 in the above-mentioned embodiments each have a shape of a truncated conical surface or a cylindrical side surface. The cross-section including the axis of the tip unit 1 is linear, but may be curved or any other if the peripherally scraped portion 55 is deformed toward the ball 10 in the distal-end deforming process.

Figure 16:
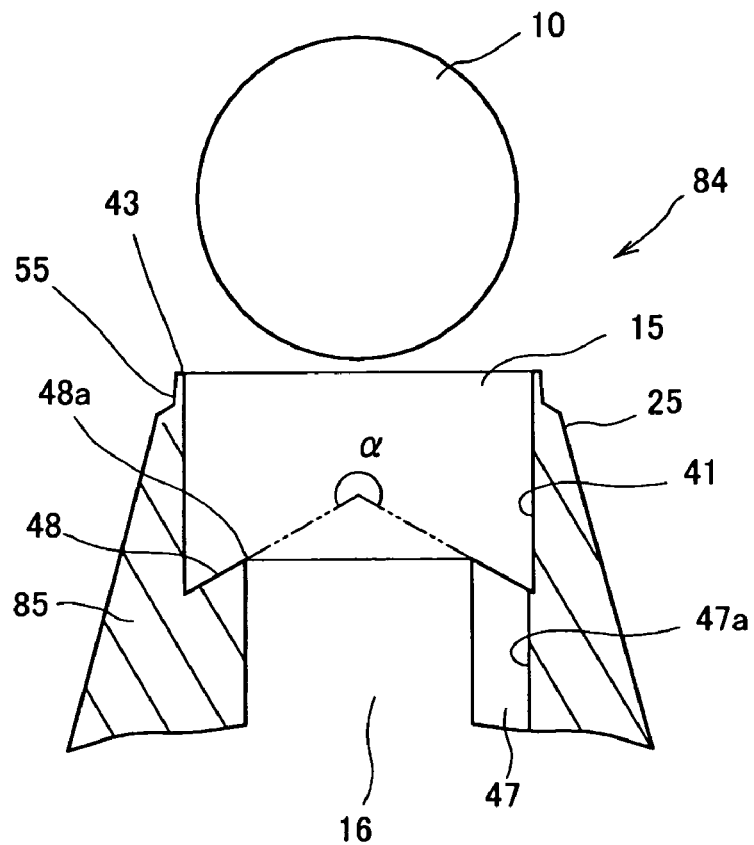
FIG. 16 is a cross-section showing the distal portion of an in-process tip unit produced by a fifth embodiment of the invention.
Figure 17:
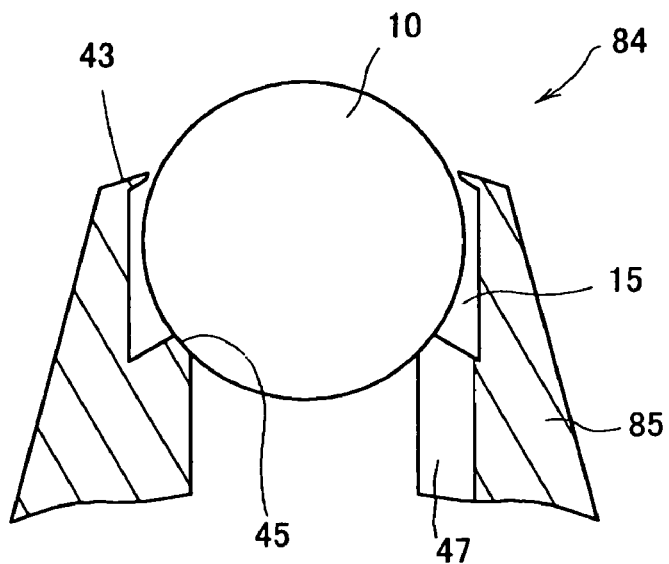
FIG. 17 is another cross-section of the distal portion of the in-process tip unit produced by the fifth embodiment of the invention.

A fifth embodiment produces a tip unit 84 by using a tip body 85 shown in FIGS. 16 and 17.

The tip body 85 is produced in a different manner from the first, second, third and fourth embodiments which produce the tip bodies 11, 70, 71, and 72. As shown in FIG. 16, a seat-side machined surface 48 has a shape of a truncated conical surface with its apex toward the distal end of the tip unit 84. An inner edge 48a of the machined surface 48 is projected. Except for the seat-side machined surface 48, the tip body 85 is similar to the tip body 11 produced by the first embodiment, both having the peripherally scraped portion 55.

As well as the first embodiment, the ball 10 is placed into the ball housing 15 to deform the distal end portion 43 and then, a ball resting seat 45 is formed by pressing the ball 10. In this way the tip unit 84 is finished as shown in FIG. 17.

As the tip unit 84 is produced using the tip body 85 with the inner edge 48a of the seat-side machined surface 48 projected, a seat deforming process is performed with smaller strength of force.

Figure 18:
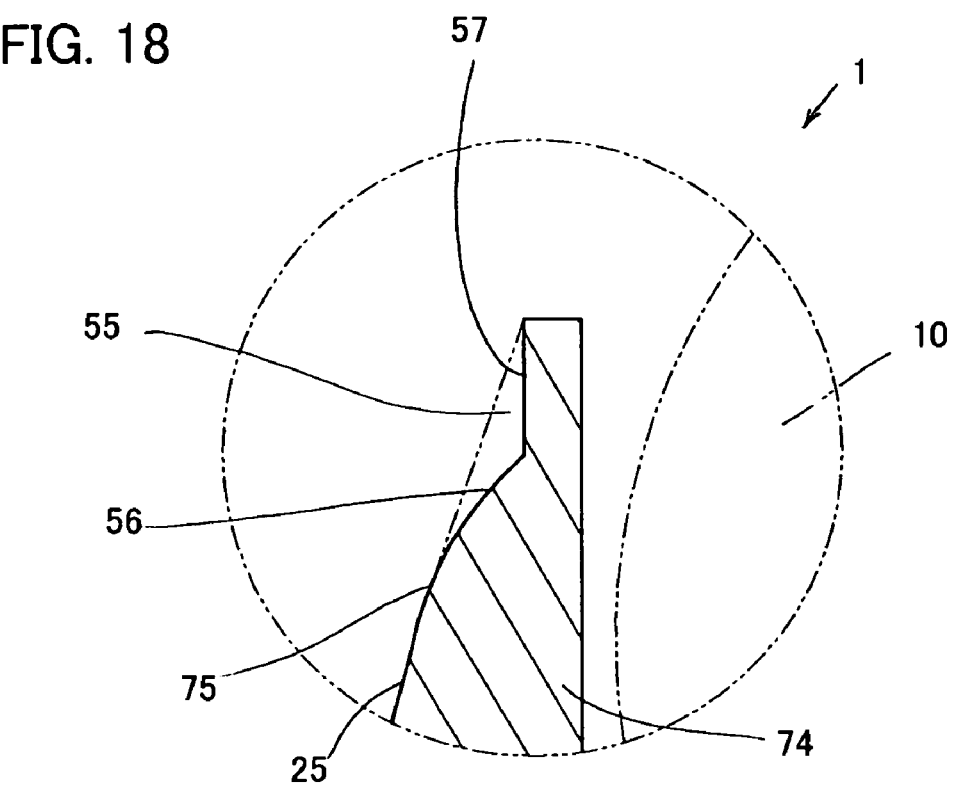
FIG. 18 is a cross-section showing the distal portion of an in-process tip unit produced by a sixth embodiment of the invention.
Figure 19:
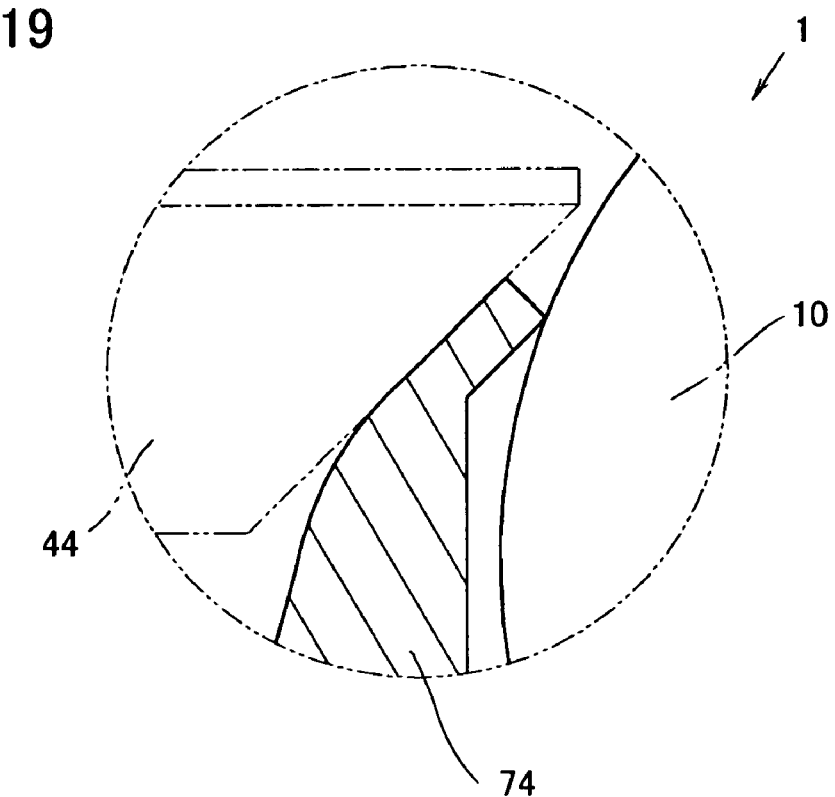
FIG. 19 is another cross-section of the distal portion of the in-process tip unit produced by the sixth embodiment of the invention.
Figure 20:
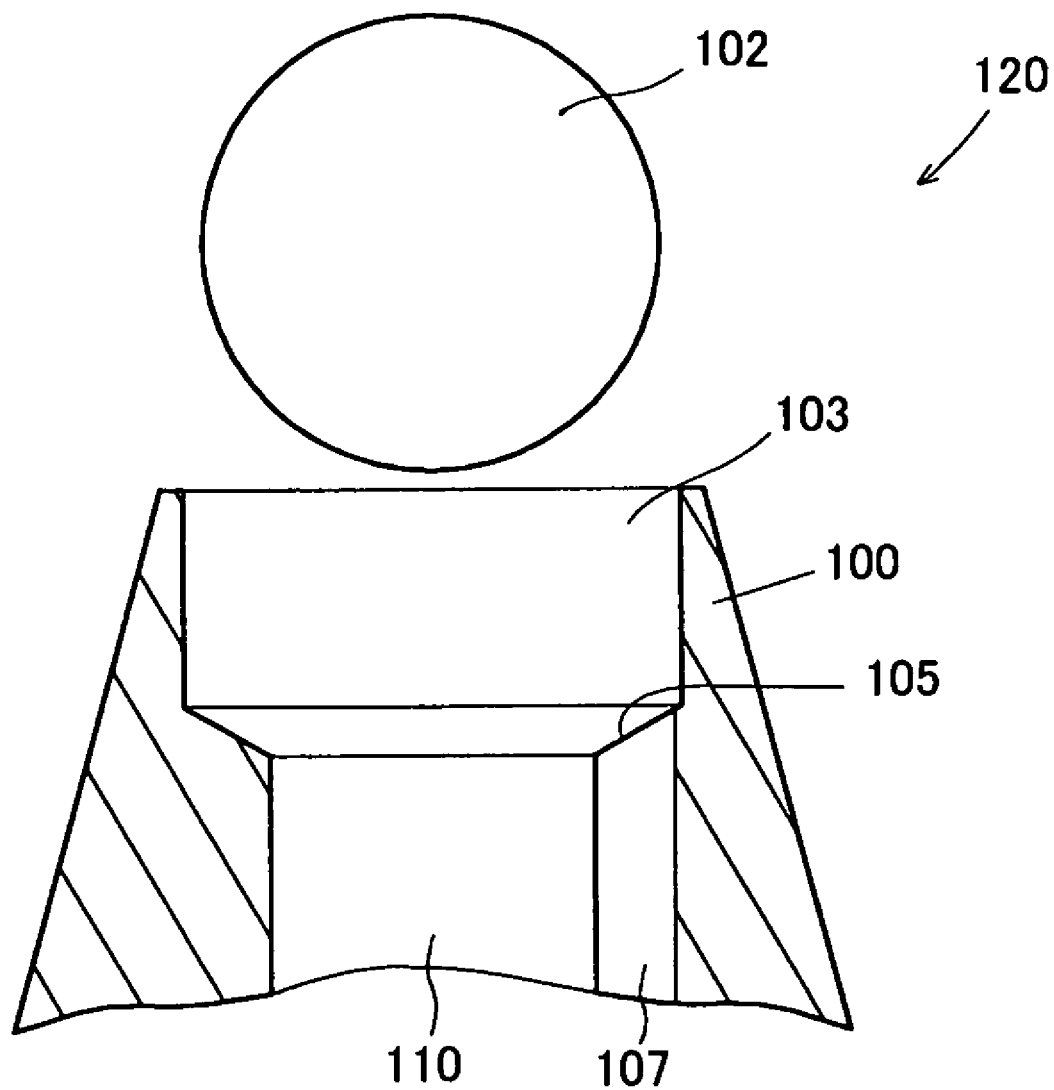
FIG. 20 is a cross-section showing the distal portion of an in-process tip unit produced by the known method.

A sixth embodiment uses a tip body 74 shown in FIGS. 18 and 19. The tip bodies 11, 70, 71, 72, and 85 respectively in the first to fifth embodiments described above each have a shape of a truncated conical surface, and as shown in the drawings such as FIG. 14B, the proximal edges 75 of the first surfaces 56 each are angled, which might result in catching the proximal edge 75 in the writing surface in writing using the tip unit 1 in these embodiments, with the result of unsmooth writing.

The tip body 74 in the sixth embodiment has an advantage obtainable by none of the above-mentioned five embodiments, the advantage being derived from the outwardly projecting curved shape of the first surface 56 of the peripherally scraped portion 55, and also from the fact that the proximal edge 75 of the first surface 56 has no corner, thereby enabling the edge 75 to extend smoothly as a continuous flat surface. Consequently, writing with the tip unit 1 using the tip body 74 has no such catch, thereby enabling constantly smooth writing.

The above-mentioned embodiments include the channel broaching process, the seat deforming process, and the diameter enlarging process, but one or more of them can be omitted.

The ink 5 used in the above-mentioned embodiments, which is a water-based ink or a water-based gel ink, is preferably selected among inks adapted to increase discharge rate. For example, the following inks may be used:

(1) ink containing at least adhesive synthetic resin emulsion and water in the form of capsular film-making ingredients;

(2) the ink specified in (1) at least whose 30% wt in the whole amount of the ink or more is occupied by the adhesive synthetic resin emulsion;

(3) the ink specified in (1) whose viscosity is in the range of 5 mPa·s to 100 mPa·s (by an ELD type viscometer, 1° 34' cone-rotor, 10 rpm, 20° C.);

(4) the ink specified in (1) whose emulsion contains groups of particles having multiple grain-size distributions;

(5) the ink specified in (1) whose emulsion is of a type having a lowest film-making temperature (MFT) of 25° C. or less;

(6) the ink specified in (1) containing an adhesive synthetic resin emulsion having an MFT of 5° C. or less and another adhesive synthetic resin emulsion having an MFT of at least 50° C.;

(7) the ink specified in (1) containing a colorant;

(8) the ink specified in (7) whose colorant is a pigment containing metal, further containing a thickener;

(9) the ink specified in (1) wherein the adhesive synthetic resin emulsion is selected at least from the group consisting of acrylic synthetic resin and styrene-based synthetic resin emulsion;

(10) the ink specified in (1) containing a film-making agent capable of plasticizing the film-making synthetic resin emulsion; or

(11) the ink specified in (1) containing a perfume.

The preferred types of ink used for the present invention are not limited to the above-listed types of ink, but a water-based ink, an oily ink, a whiteout liquid, and any other types of liquid can be used.

The discharge amount Z of ink in writing with the use of the ball-point pen 18 can be at least 100 mg/10 m.

Further, suppose that the ball 10 has an outside diameter D (mm), the writing thickness formed by writing H (μm)×$10^3$, and the discharging amount of ink in writing Z (mg/10 m). Then, if the relationship among D, H, and Z in the pen 18 satisfies at least one of the following conditions (1) to (3), the pen 18 can be used. Herein, the discharging amount of ink Z (mg/10 m) means the discharging amount (mg) in writing for 10 m:

(1) a ball-point pen whose H×$10^3$/D, which is a ratio of H to D, is 15 or more;

(2) a boll-point pen whose Z/D, which is a ratio of Z to D, is 125 or more; or (3) a ball-point pen whose H×$10^3$/D is 15 or more, and Z/D is 125 or more.

The pen 18 satisfying the above-mentioned requirements can be made at ease by adjusting the ink gradients, the viscosity and the ball diameter.

The first embodiment is provided with the urging member 12, but it can be omitted.

The present application hereby incorporates complete contents described in Japanese Applications Nos. 2003-149512, 2003-149491, and 2003-149640 by reference herein.

INDUSTRIAL APPLICABILITY

As described above, the method embodying the present invention is used to produce a tip unit for a liquid applicator in a stable and easy manner.

The invention claimed is:

1. A method for producing a tip unit for a liquid applicator, the tip unit having a central axis, wherein the tip unit comprises a tip body having a ball housing and a ball,
the ball housing having an opening at a distal end of the tip body and holding the ball therein,
the method comprising:
a first process of shaping the contour of the tip body in the form of a truncated conical surface;
a second process of forming the ball housing in the tip body;
a third process of placing the ball into the ball housing;
a fourth process of scraping the peripheral side of the distal end portion of the tip body after the first process to thereby make the distal end portion of the tip body radially thinner where the distal end portion of the tip body is scraped; and
a fifth process of deforming the peripherally scraped distal end portion of the tip body toward the ball.

2. The method according to claim 1, further comprising a sixth process of making the inner diameter of the distal end of the tip body larger than that of the ball housing.

3. The method according to claim 2, wherein the sixth process includes using a forming tool to perform the process.

4. The method according to claim 2, wherein the sixth process is performed simultaneously with the second process.

5. The method according to claim 1, further comprising a seventh process of broaching a channel at the rear end of the ball housing, the channel extending axially of the tip body.

6. The method according to claim 1, further comprising an eighth process of deforming the rear end of the ball housing by pressing the ball from the distal end of the tip body.

7. The method according to claim 6,
wherein the second process includes producing a ball resting seat projecting toward the distal end portion of the tip body, and
wherein the eighth process includes deforming the seat to form a deformed surface.

8. The method according to claim 7, wherein the second process includes projecting the inside surface of the seat toward the distal end of the tip body.

9. The method according to claim 7, wherein the second process includes processing the ball resting seat such that it has a shape of a truncated conical surface with its apex toward the distal end of the tip unit.

10. A tip unit for a liquid applicator, the tip unit being produced by the method according to claim 1.

11. The tip unit according to claim 10, and using water-based inks or water-based gel inks.

12. A liquid applicator incorporating the tip unit produced by the method according to claim 1.

13. The liquid applicator according to claim 12, wherein the ball is urged toward the distal end portion of the tip body.

14. The method according to claim 1 wherein the second surface has an axial extent and the fifth process further includes pressing the distal end portion of the tip body by means of a slant surface of a presser so that the second surface is reshaped over the entire axial extent of the second surface along a slant portion of the presser.

15. A method for producing a tip unit for a liquid applicator, wherein the tip unit comprises a tip body having a ball housing and a ball, the ball housing having an opening at a distal end of the tip body and holding the ball therein, the method comprising:

a first process of shaping the contour of the tip body in the form of a truncated conical surface;

a second process of forming the ball housing in the tip body;

a third process of placing the ball into the ball housing;

a fourth process of scraping the peripheral side of the distal end portion of the tip body after the first process; and a fifth process of deforming the peripherally scraped distal end portion of the tip body toward the ball, wherein the fourth process includes differentiating the shapes of the side surfaces of a first surface and a second surface so that the second surface resides nearer to the distal end of the tip body than the first surface, the first surface being a truncated conical surface, the second surface being another truncated conical surface or a cylindrical surface, and wherein the fifth process includes enlarging the angle at which the first surface and the second surface intersect in a plane passing through the axis of the tip unit.

16. The method according to claim 15, wherein the fifth process includes pressing the distal end portion of the tip body by means of a slant surface of a presser moved axially of the tip body until the slant surface comes into contact with the first surface, thereby deforming at least a part of the second surface in compliance with the contour of the slant surface.

17. The method according to claim 15, wherein the fifth process includes deforming the distal end portion of the tip body such that the angle between the first surface and the second surface is in the range of 170° to 190°.

18. The method according to claim 16, wherein the fifth process includes pressing the distal end portion of the tip body such that the portion deformed by the process can have a shape of a truncated conical surface, and that the rear edge of the first surface lies in an imaginary extension of the conical surface.

19. The method according to claim 15, wherein the fourth process includes machining the first surface into an outwardly curved surface, to which the rear edge of the first surface flatly extends with no corner.

* * * * *